(12) United States Patent
Tirpak et al.

(10) Patent No.: US 8,250,001 B2
(45) Date of Patent: Aug. 21, 2012

(54) INCREASING USER INPUT ACCURACY ON A MULTIFUNCTIONAL ELECTRONIC DEVICE

(75) Inventors: Thomas M. Tirpak, Glenview, IL (US); Anant Athale, Schaumburg, IL (US)

(73) Assignee: Motorola Mobility LLC, Libertyville, IL (US)

( * ) Notice: Subject to any disclaimer, the term of this patent is extended or adjusted under 35 U.S.C. 154(b) by 884 days.

(21) Appl. No.: 12/337,768

(22) Filed: Dec. 18, 2008

(65) Prior Publication Data
US 2010/0161522 A1 Jun. 24, 2010

(51) Int. Cl.
*G06F 3/41* (2006.01)
(52) U.S. Cl. .......................................... 706/11
(58) Field of Classification Search ........... 706/11, 706/52; 345/156; 715/866
See application file for complete search history.

(56) References Cited

U.S. PATENT DOCUMENTS

| | | | |
|---|---|---|---|
| 5,620,903 A | 4/1997 | Malick et al. | |
| 5,809,267 A | 9/1998 | Moran et al. | |
| 6,104,119 A | 8/2000 | Guzik et al. | |
| 6,169,538 B1 | 1/2001 | Nowlan et al. | |
| 6,297,838 B1 | 10/2001 | Chang et al. | |
| 6,417,836 B1 | 7/2002 | Kumar et al. | |
| 7,136,710 B1 | 11/2006 | Hoffberg et al. | |
| 7,236,618 B1 | 6/2007 | Chui et al. | |
| 7,301,527 B2 | 11/2007 | Marvit | |
| 7,301,529 B2 | 11/2007 | Marvit et al. | |
| 7,308,112 B2 | 12/2007 | Fujimura et al. | |
| 7,339,580 B2 | 3/2008 | Westerman et al. | |
| 7,401,300 B2 | 7/2008 | Nurmi | |
| 2002/0084721 A1 | 7/2002 | Walczak | |
| 2002/0122072 A1 | 9/2002 | Selker | |
| 2002/0160817 A1 | 10/2002 | Salmimaa et al. | |
| 2003/0016247 A1 | 1/2003 | Lai et al. | |
| 2003/0063128 A1 | 4/2003 | Salmimaa et al. | |
| 2003/0234597 A1 | 12/2003 | Rosenberg | |
| 2006/0244733 A1 | 11/2006 | Geaghan | |
| 2006/0279530 A1* | 12/2006 | Jung et al. ............ 345/156 |
| 2007/0046641 A1 | 3/2007 | Lim | |

(Continued)

FOREIGN PATENT DOCUMENTS
EP 1777611 B1 4/2010
(Continued)

OTHER PUBLICATIONS

Nintendo Gamecube Instruction Booklet GCN101_MANUAL_EMGLISH.PDF; copyright 2001-2004, 1-16 Pages.
Sony Game Cube Manual, downloaded from internet Feb. 16, 2009, 1 Page.
(Continued)

*Primary Examiner* — Jeffrey A Gaffin
*Assistant Examiner* — Ola Olude Afolabi (57) ABSTRACT

An electronic device and a method of dynamically adapting a sensitivity of at least one user interface component on the electronic device. A device context corresponding to the electronic device can be identified and processed in real time to identify a potential user intent and to determine a probability that the potential user intent corresponds to an actual user intent. A user input sensitivity parameter can be selected based on the potential user intent and the determined probability. The sensitivity of the at least one user interface component can be adapted to correspond to the user input sensitivity parameter.

20 Claims, 3 Drawing Sheets

U.S. PATENT DOCUMENTS

| | | |
|---|---|---|
| 2007/0057912 A1 | 3/2007 | Romriell et al. |
| 2007/0247643 A1 | 10/2007 | Nakamura et al. |
| 2007/0261001 A1 | 11/2007 | Nagiyama et al. |
| 2009/0058823 A1 | 3/2009 | Kocienda |

FOREIGN PATENT DOCUMENTS

| | | |
|---|---|---|
| WO | 8801438 | 2/1988 |
| WO | 03005179 A1 | 1/2003 |
| WO | 03100591 A2 | 12/2003 |

OTHER PUBLICATIONS

Technical Article—New piezoelectric switch technology delivers high performance at comparable cost to resistive switches, http://www.acaltechnology.com/datasheets/Radiatron/piezoelectric.pdf, Internal Technical Paper, ACAL Technology, Nov. 14, 2000, copyright Radiatron Components Ltd 1998-2002, 6 pages.

\* cited by examiner

INCREASING USER INPUT ACCURACY ON A MULTIFUNCTIONAL ELECTRONIC DEVICE

BACKGROUND OF THE INVENTION

1. Field of the Invention

The present invention generally relates to increasing the accuracy of user inputs to electronic devices.

2. Background of the Invention

In the communications industry, there has been a growing trend towards increasing the functionality of certain types of communication devices. For example, in addition to supporting mobile telecommunications, many mobile telephones now also may be used to send and receive text messages and e-mails, access the Internet, take photographs, capture audio and video, and play games.

In general, as the number of functions that are provided by communication devices increase, so too does the complexity of their user interfaces. For example, user interfaces oftentimes are implemented using complex hierarchical menus. Unfortunately, such menu schemes are not always intuitive and, for some users, the menus can be very difficult to navigate. Moreover, many communication devices include buttons or keys that are susceptible to receiving un-intended user inputs or user inputs that trigger un-intended actions. An example of an un-intended user input is an accidental button depression that triggers a communication device to take a photograph while the communication device is held within one's purse or a pocket. An un-intended action can be triggered when a user enters an input believing that the communication device is in a certain mode, but the communication device actually is another mode. Unfortunately, as the functionality of typical communication devices continues to increase, so too does the likelihood of such devices receiving un-intended user inputs.

SUMMARY OF THE INVENTION

The present invention relates to a method of dynamically adapting a sensitivity of at least one user interface component on an electronic device. The method can include identifying a device context corresponding to the electronic device and processing the device context in real time to identify a potential user intent and to determine a probability that the potential user intent corresponds to an actual user intent. The method also can include selecting a user input sensitivity parameter based on the potential user intent and the determined probability and adapting the sensitivity of at least one user interface component to correspond to the user input sensitivity parameter.

The present invention also relates to an electronic device. The electronic device can include a controller that identifies a device context corresponding to the electronic device and processes the device context in real time to identify a potential user intent and to determine a probability that the potential user intent corresponds to an actual user intent. The controller also can select a user input sensitivity parameter based on the potential user intent and the determined probability and adapt the sensitivity of the at least one user interface component to correspond to the user input sensitivity parameter.

Yet another embodiment of the present invention can include a computer program product including a computer-usable medium having computer-usable program code that, when executed, causes a machine to perform the various steps and/or functions described herein.

BRIEF DESCRIPTION OF THE DRAWINGS

Preferred embodiments of the present invention will be described below in more detail, with reference to the accompanying drawings, in which.

DETAILED DESCRIPTION

While the specification concludes with claims defining features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

Arrangements described herein relate to dynamically adapting the sensitivity of user interface components on an electronic device based on present circumstances detected by the electronic device. The sensitivity adaptation can be based on, for example, data received from various sensors, the state of one or more applications presently instantiated on the electronic device, user preferences, or the like, which collectively indicate a device context for the electronic device. For example, the device context can be processed to recognize gestures or anticipated user intent in order to dynamically adapt the sensitivity of the user interface components for anticipated user requirements. Such processing also can dynamically determine whether additional user inputs are required based on the device context or provide haptic responses via user interface components. Accordingly, the risk of unintended actions being initiated on the electronic device can be mitigated.

Figure 1:
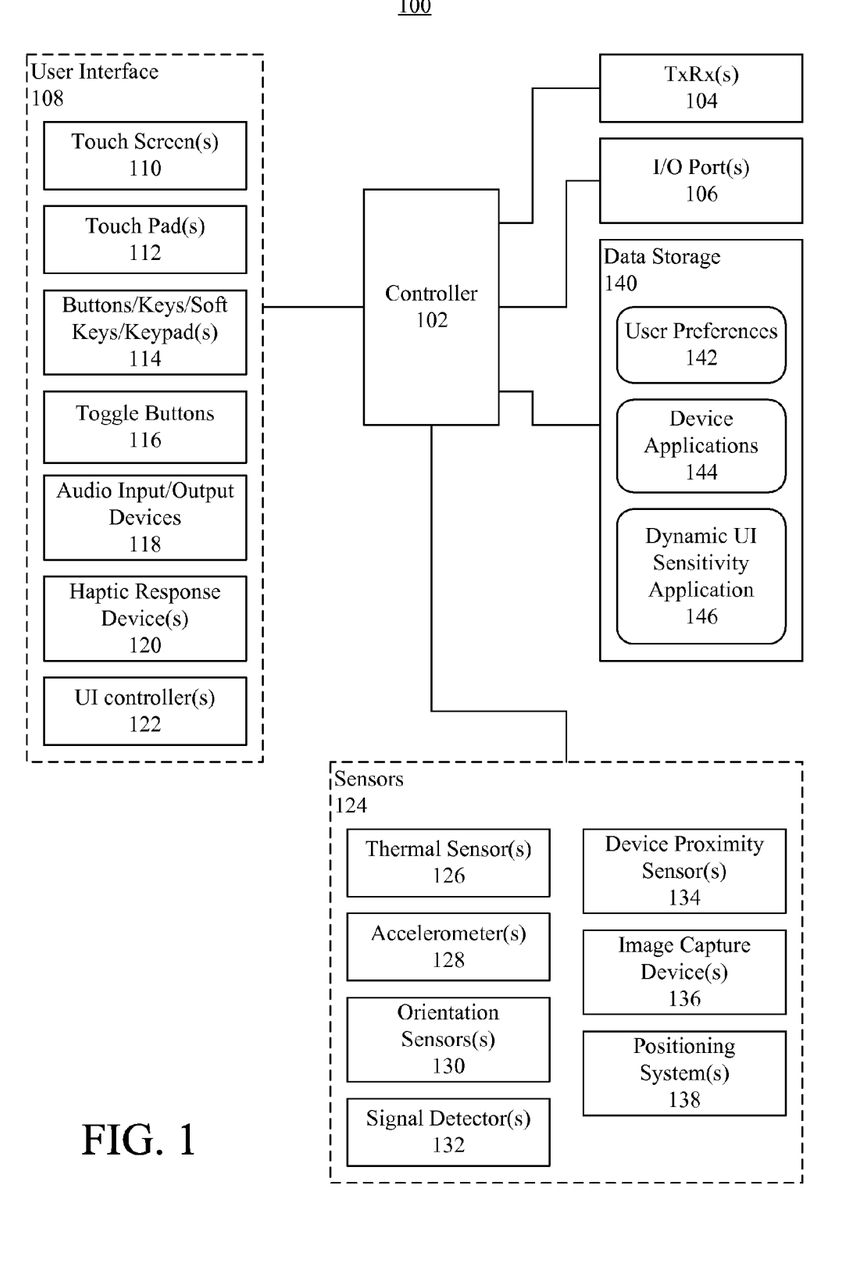
FIG. 1 depicts a block diagram of an example electronic device that is useful for understanding the present invention.

FIG. 1 depicts a block diagram of an electronic device 100 that is useful for understanding the present invention. The electronic device 100 can be any electronic device that includes a user interface 108, which may include one or more user input components. Examples of the electronic device 100 can include, but are not limited to, telephones, radios, multimedia devices (e.g. audio devices, video devices, audio/video devices, etc.), computers, personal digital assistants, navigation devices (e.g. global positioning systems), gaming devices, appliances, and so on. The electronic devices may be portable devices, but the invention is not limited in this regard.

The electronic device 100 can include a controller 102, which may comprise, for example, one or more central processing units (CPUs), one or more digital signal processors (DSPs), one or more application specific integrated circuits (ASICs), one or more programmable logic devices (PLDs), a plurality of discrete components that can cooperate to process data, and/or any other suitable processing device. In an arrangement in which a plurality of such components are provided, the components can be coupled together to perform various processing functions as described herein.

The electronic device 100 also can include one or more transceivers 104. The transceiver(s) 104 can be configured to modulate and demodulate signals to convert signals from one form to another, and can transmit and/or receive such signals over one or more various wireless communication networks and/or using direct mode communication. For example, the transceiver(s) 104 can be configured to communicate data over a cellular communication network, a wide area network, a local area network, or using personal area network communications. In this regard, the transceivers 104 can be configured to communicate in accordance with any suitable communication protocols and specifications. One or more input/output (I/O) ports 106 also can be provided for the electronic device 100. The I/O ports 106 can receive audio/video signals and other electronic data from other electronic devices and/or send such signals/data to other electronic devices.

The electronic device 100 can include a user interface 108 that communicates user inputs to the controller 102 or other suitable devices, and communicates information from the controller 102 or other devices to the user. The user interface 108 can comprise a variety of components. In illustration, the user interface 108 can include one or more tactile input devices, for instance one or more touch screens 110 that can receive tactile and/or stylus inputs. In lieu of the touch screen 110, or in addition to the touch screen 110, the user interface 108 can include a display (not shown) that is not a touch screen. The user interface 108 also can include one or more touch pads, 112, one or more buttons, keys, soft keys, keypads 114, one or more toggle buttons 116, or any other devices suitable for receiving a tactile user input and communicating the tactile user input to the controller 102.

The user interface 108 further can include input/output audio devices 118, for example one or more audio processors, input audio transducers, output audio transducers, and the like. In one arrangement, an audio processor can comprise vocoder that analyzes and synthesizes human voice. The input/output audio devices 118 can receive output audio signals from the controller 102 and communicate such signals to a user. Similarly, the input/output audio devices 118 can receive input audio signals from a user and communicate such signals to the controller 102. In one arrangement, speech recognition can be implemented to process such signals.

Haptic response devices 120 also can be provided for the user interface 108. The haptic response devices can apply haptic responses (e.g. forces and/or vibrations) to user input devices, such as the buttons/keys/soft keys/keypads 114 or the toggle buttons 116. Haptic response devices can be applied to the touch screen 110, the touch pad 112, or to other components of the user interface 108. Examples of devices that may be used to exert a force or vibration can include a piezoelectric element, an elastomeric polymer that expands and contracts in response to an applied electric field, an actuator and a vibration element, but a myriad of other devices can be used and the invention is not limited in this regard.

The user interface 108 can include one or more user interface controllers 122 that adapt the sensitivity of one or more of the user interface components 110-120 based on user input sensitivity parameters received from the controller 102. In another arrangement, the sensitivity adaptation can be performed by the controller 102. In this case, the portion of the controller 102 that adapts the sensitivity of the user interface components 110-120 can be considered to be part of the user interface 108.

Further, additional devices (not shown) can be components of the user interface 108. For instance, the user interface 108 also can include a headset, a speakerphone, or other device(s) communicatively linked to the controller 102 via the transceiver(s) 104 or via the audio/video I/O ports 106.

The electronic device 100 further can include one or more sensors 124. The sensors 124 can include one or more thermal sensors 126 that detect proximity of the electronic device 100 to a user. One or more accelerometers 128 can be provided to detect movement of the electronic device 100. Further, the electronic device 100 can include one or more orientation sensors 130 that detect an orientation of the electronic device 100.

The electronic device 100 also can include signal detectors 132 that detect audio, video and/or other electronic signals communicated to and/or from the electronic device 100. In one arrangement, the signal detector(s) 132 can be directly linked to the transceiver(s) 104, the audio/video I/O ports 106 and/or the user interface 108 in order to facilitate signal detection, though this need not be the case. Moreover, the signal detector(s) 132 can be embodied within the controller 102, for instance as circuitry that executes suitable program code (e.g. software, firmware, etc.).

The electronic device also can include one or more image capture devices 136 that capture still images and/or video. One or more positioning systems 138 also can be provided to determine a location of the electronic device (e.g. a global positioning system or a local positioning system). Still, any other suitable sensors 124 can be incorporated into the electronic device 100 and the invention is not limited in this regard.

The electronic device 100 further can include a data storage 140 communicatively linked to the controller 102. The data storage 140 can include one or more storage devices, each of which may include, but is not limited to, a magnetic storage medium, an electronic storage medium, an optical storage medium, a magneto-optical storage medium, and/or any other storage medium suitable for storing digital information. In one arrangement, the data storage 140 can be integrated into the controller 102, though this need not be the case.

User preferences 142 can be stored on the data storage 140. The user preferences 142 can correspond to system settings, application settings, or any other settings which a user may wish to personalize. One or more device applications 144 which may be executed on the electronic device 100 also can be provided on the data storage 140. Such applications can be executed by the controller 102 or another suitable processing component.

A dynamic user interface sensitivity application (UI application) 146 also can be stored on the data storage 140, or otherwise made accessible to the controller 102. The UI application 146 can be executed by the controller 102 to implement the methods and processes described herein that are performed by the electronic device 100 to dynamically adapt the sensitivity of the user interface components on the electronic device 100.

For example, the controller 102 can execute the UI application 146 to identify a device context for the communication device 100. As used herein, the term "device context" means interrelated conditions corresponding to the electronic device 100 or data received by the electronic device 100. For instance, the device context can include data received from one or more of the sensors 124, data representing the state(s) of one or more of the device applications 144, data corresponding to the user preferences 142, data collected from other entities and received via the transceiver 104 and/or I/O ports 106, and the like. Moreover, when identifying the device context, the data can be selected, or filtered, so as to associate data that is interrelated.

In illustration, the orientation sensor 130 can indicate that the electronic device 100 is vertically oriented, the data representing the state of an image capture application can indicate that the image capture application is instantiated on the electronic device 100, and the data corresponding to the user preferences 142 can indicate that the user has enabled use of the image capture application. Such data can be interpreted as being interrelated and thus represent device context for the electronic device 100. In some instances, more than one device context may be identified for the electronic device, though this need not be the case.

The controller 102 also can execute the UI application 146 to dynamically adapt the sensitivity of one or more of the components 110-120 of the user interface 108 based on present circumstances detected by the electronic device 100. The sensitivity adaptation can be based on data received from the sensor(s) 124, the state of the device applications 144 presently instantiated on the electronic device 100, the user preferences 142, or the like, which can collectively indicate device context for the electronic device 100. The device context can be processed, for instance using fuzzy logic, to recognize gestures or anticipated user intent in order to dynamically adapt the sensitivity of components 110-120 of the user interface 108 for anticipated user requirements. The UI application 146 also can determine whether additional user inputs are required and provide haptic responses via user interface 108.

Figure 2:
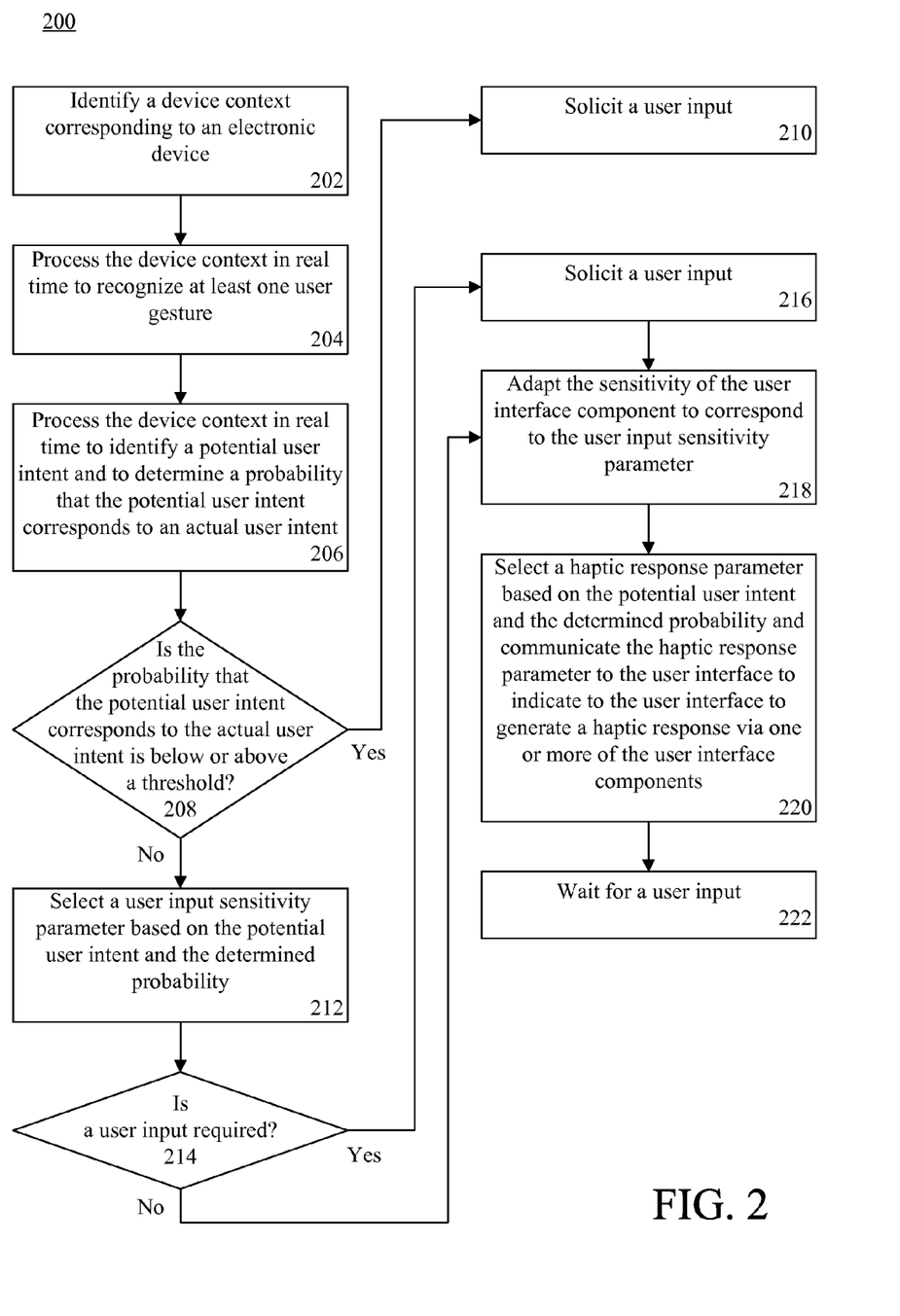
FIG. 2 is a flowchart presenting a method of dynamically adapting the sensitivity of user interface components on an electronic device, which is useful for understanding the present invention.

FIG. 2 is a flowchart presenting a method 200 of dynamically adapting the sensitivity of user interface components on the electronic device 100. Such method can be implemented by the UI application, for example. At step 202, a device context corresponding to an electronic device can be identified. For example, data received from one or more sensors, data representing the state of one or more applications instantiated on the electronic device, and/or data corresponding to at least one user preference can be processed to identify the device context. In one arrangement, data corresponding to more than one device context may be identified. Such data can be aggregated into respective device contexts and further processed, as will be described.

At step 204, the device context(s) can be processed in real time to recognize at least one potential user gesture. For instance, one or more potential gestures can be recognized based on movement and/or orientation of the electronic device. For example, if the acceleration data indicates that the electronic device is being held still, this can indicate one potential gesture, while motion of the electronic device can indicate another potential gesture. If the orientation data indicates that the electronic device is oriented vertically, this also can indicate a particular potential gesture that is different than a potential gesture that would be indicated if the orientation data indicates that the electronic device is oriented horizontally, or at some other angle. For the purpose of clarity, data contained in a device context that may correspond to potential user gestures may be referred to as "gesture data."

Values can be assigned to the gesture data to indicate probabilities that the potential gestures to which the gesture data correspond are of significance for recognizing a user intent. By way of example, various potential rates of acceleration can be assigned respective values (e.g. weighting factors) a priori, and data corresponding to the potential rates of acceleration can be stored in a suitable data storage so as to correspond to their respective values. Further, data representing combinations of potential acceleration parameters, for instance acceleration parameters representing acceleration along more than one axis also can be assigned respective values, and these data also can be stored so as to correspond to their respective values. Moreover, potential gestures also may be indicated by various combinations of different types of data, and selected combinations of any such data also can be stored with corresponding assigned values.

When the device context contains gesture data received from one or more sensors, the gesture data can be compared to the stored data and assigned the values associated with the stored data with which the gesture data most closely corresponds. In one arrangement, if the gesture data corresponds closely to more than one instance of stored data, interpolation can be applied to the values associated with the stored data in order to arrive at values to be assigned to the gesture data.

The values that are assigned to the stored data can be determined in any suitable manner. For instance, empirical data can be used to train a neural network to represent a user-independent mapping between the data and a set of probabilities that such data may occur for various types of user gestures.

At step 206, the device context can be processed in real time to identify a potential user intent and to determine a probability that the potential user intent corresponds to an actual user intent. The actual user intent can be a near-term user intent (e.g. a user intent for a process to occur within a matter of seconds or minutes). Again, such processing can include comparing the data in the device context to values assigned a priori to various stored data to which the device context data may correspond and assigning values to the data in the device context. Such values can correspond to, or be interpolated from, values corresponding to the stored data. As noted, such stored data and the respective values can be established by training a neural network, or in any other suitable manner.

When processing the device context to identify potential user intents and probabilities reflecting the likelihood that the potential user intents are actual user intents, such processing may include processing the values assigned to gesture data, as well as other data contained in the device context that may indicate other circumstances to arrive at potential user intents. For instance, data representing the state of one or more applications instantiated on the electronic device and data corresponding to at least one user preference can be processed to identify potential user intents and values based on the stored data that represent the probability of the potential user intents being actual user intents.

It should be noted that data that may have been processed to identify a potential user gesture need not be excluded from the present processing functions. For example, acceleration data can again be processed to assign a probability that the electronic device is stored in a user's pocket or purse, and that the user intent is to merely be alerted if a call or message is received by the electronic device. Notwithstanding these examples, any data contained in the device context(s) can be processed to recognize a potential user intent and the invention is not limited in this regard.

In an arrangement in which a plurality of device contexts are identified and more than one potential user intent is identified, each of the potential user intents can be assigned a respective probability. In this case, the potential user input having the highest probability of being the actual user intent can be identified for further processing.

Referring to decision box 208, a determination can be made whether the probability that the identified potential user intent corresponds to the actual user intent is below or above a threshold. For instance, the value assigned to the potential user intent can be compared to one or more threshold values correlating to the user's near term intentions. If the probability is below or above the threshold value, at step 210 a user input can be solicited in order to clarify the user's intentions.

If the probability is not below or above the threshold value, at step 212 a user input sensitivity parameter can be selected based on the potential user intent and the determined probability that the potential user intent corresponds to the actual user intent. Referring to decision box 214, if another user input is required, at step 216 the user input can be solicited. Otherwise, the process can proceed to step 218.

At step 218, the sensitivity of the user interface component can be adapted to correspond to the user input sensitivity parameter. In one aspect of the inventive arrangements, various user interface sensitivity profiles can be established and selectively applied to various user interface components, as will be described herein. For instance, the sensitivity of a touch pad, touch screen, buttons, keys, soft keys, and/or keypads to user inputs can be increased or decreased based on a particular sensitivity profile that is selected based on the input sensitivity parameter.

In illustration, the rate at which a scroll is implemented in response to user inputs on a touchpad can be dynamically adapted in accordance with a corresponding sensitivity profile. Changing the sensitivity of such user interface components can be achieved by adjusting voltage gains, adjusting scaling factors correlating user inputs to input signals, and so on. In another example, the active area of a touch screen or touch pad can be dynamically adapted based on a corresponding user sensitivity profile. For example, the active area can be increased or decreased in accordance with a particular sensitivity profile that is selected. The sensitivity of input/output audio devices also can be selected based on an identified sensitivity profile, for instance by adjusting an input gain or an output gain.

At step 220, a haptic response parameter can be selected based on a corresponding user sensitivity profile. The haptic response parameter can be communicated to the user interface to indicate to the user interface to generate a haptic response via one or more of the user interface components. The haptic response can be a vibration, a change in the resistance of a user interface component to being depressed or moved, a force feed back applied via a user interface component, and so on. At step 222, the electronic device can wait for the user to provide a user input via the user interface. As will be described, in one arrangement, the size, contour, and/or shape of a UI control button can be physically changed, according to the sensitivity profile.

Figure 3:
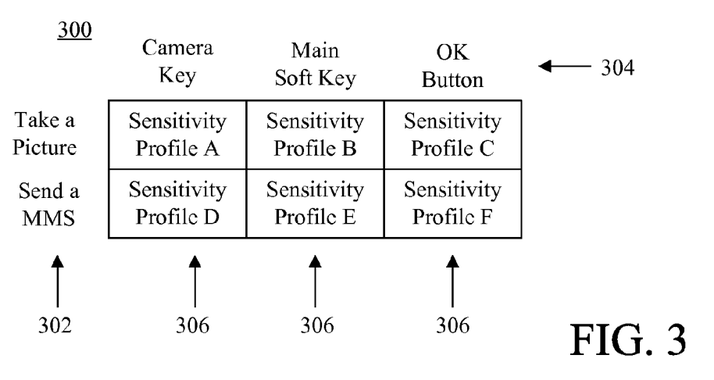
FIG. 3 depicts a table of user sensitivity profiles, which is useful for understanding the present invention.

Referring to FIG. 3, a table 300 of user sensitivity profiles is presented, which is useful for understanding the present invention. The table 300 includes a plurality of potential user intents 302 (e.g. intended actions) and a plurality of potential user inputs 304 for the intended actions. In addition, a plurality of sensitivity profiles 306 are provided, each of which corresponds to a potential user intended action 302 and a potential user input 304. Each of the sensitivity profiles can be associated with a particular user interface component, or a plurality of user interface components.

For example, "Sensitivity Profile A" can correspond to "Take a Picture" and a "Camera Key," "Sensitivity Profile B" can correspond to "Take a Picture" and a "Main Soft Key," and "Sensitivity Profile C" can correspond to "Take a Picture" and an "OK Button." Similarly, "Sensitivity Profile D" can correspond to "Send a MMS" (i.e. send a multimedia message) and the "Camera Key," "Sensitivity Profile E" can correspond to "Send a MMS" and the "Main Soft Key," and "Sensitivity Profile E" can correspond to "Send a MMS" and the "OK Button." Of course, any of a myriad of potential user intended actions 302 and potential user inputs 304 can be associated with sensitivity profiles 306, and the invention is not limited to these examples.

When a potential user intent 302 is identified, an appropriate sensitivity profile can be applied to one or more possible user inputs. For example, if the identified potential user intent 302 is to "Take a Picture," "Sensitivity Profile A" can be applied to the "Camera Key," "Sensitivity Profile B" can be applied to the "Main Soft Key," and so on.

Figure 4:
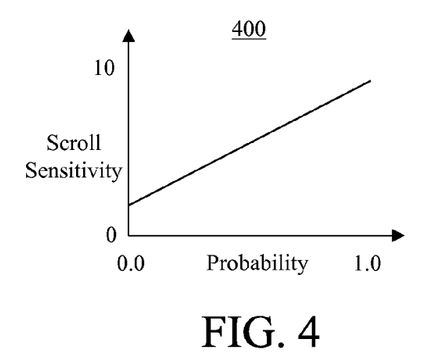
FIGS. 4-6 depict a plurality of user sensitivity profiles that are useful for understanding the present invention.
Figure 5:
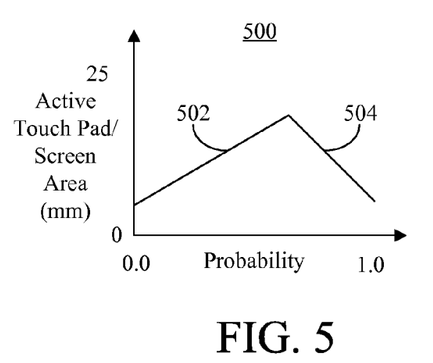
Figure 6:
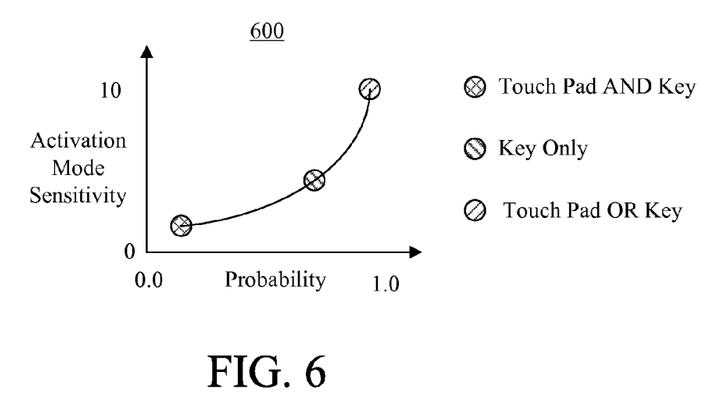

Examples of the sensitivity profiles, 400, 500, 600 are depicted in FIGS. 4, 5 and 6, respectively. The sensitivity profiles 400-600 can be based, at least in part, on the potential user intent that was identified and the probabilities assigned to that potential user intent, which are represented by the respective horizontal axes. Accordingly, the sensitivity profile 400-600 applied when one potential user intent is identified may be different than the sensitivity profile 400-600 that is applied when another potential user intent is identified, as noted. Moreover, each sensitivity profile 400-600 can represent a range of possible adaptations that are determined based on the probability assigned to the potential user intent. The adaptations can include, for example, response delays, thread and/or process priorities, scroll sensitivities, active touchpad and/or touch screen areas, activation mode sensitivities, minimum activation times, maximum activation times, minimum pressures for various probability values, and so on.

The adaptations for the sensitivity profiles 400-600 need not be constant, but instead can vary depending on the probability determined for a particular potential user intent. Each adaptation may be represented as a set of one or more continuous functions that process the determined probability as an input value to determine the control sensitivity to be applied to the corresponding user interface component. Moreover, a weighting factor may be applied to the control sensitivity determined by the function in order to determine a user input sensitivity parameter that is applied to the user interface component. In one arrangement, the weighting factor can be established a priori and can be, for example, equal to 1.0. In another arrangement, the weighting factor can be established a priori and reflect a user profile of a given user or a user profile associated with a class of users. In yet another arrangement, the weighting factor can be established dynamically based on historical data. In this case the weighting factor can reflect an individual user's likelihood of wanting to accomplish a specific task with the electronic device.

FIG. 4 depicts an arrangement in which a sensitivity profile 400 includes a continuous function that may be applied to the scroll sensitivity of a touch screen, a touchpad, a button, a key, a soft key, a toggle button, or the like. In this example, a rate of scroll can correspond to the probability of a potential user intent being the actual user intent. For instance, if the potential user intent is to browse a plurality of documents presented via the user interface is 0.9, the control sensitivity that is applied to the scroll rate can be 8. On the other hand, if the probability that the potential user intent is to browse a plurality of documents presented via the user interface is 0.4, the control sensitivity that is applied to the scroll rate can be 4.5. As noted, a weighting factor can be applied to the control sensitivity to arrive at a user input sensitivity parameter that is applied to the scroll function.

FIG. 5 depicts an arrangement in which a sensitivity profile 500 includes a plurality of continuous functions 502, 504 that define control sensitivity based on the probability identified for a potential user intent. The functions 502, 504 can be sequentially implemented. For example the function 502 can apply to probability values between 0 and 0.6, and a second function can apply to probability values between 0.6 and 1.0. Although two functions are presented in the example, any number of functions, code logic, or models that map a probability value to a sensitivity value can be implemented in the sensitivity profile 500. It should be noted that these functions, code logic or models need not be deterministic, analytical functions in the strict mathematical sense, but instead may be implemented an any suitable manner.

For instance, in one embodiment, a sensitivity profile model may be implemented as a set of logical rules (e.g, "if the set of conditions A is true, then the output of the model is B"). In another embodiment, the model may be implemented as a discrete-event Simulation, where the inputs to the model are used to initialize a deterministic or stochastic simulation, and the outputs of the model comprise of one or more metrics based on observation of the simulation history. In yet another embodiment, the model may be constructed as a hybrid of one or more types of models, including: analytical, logical, and empirical. An example of this kind of model is a feed-forward, multi-layer neural network.

FIG. 6 depicts an arrangement in which a sensitivity profile 600 can be implemented to identify the types of user inputs that are required to activate a task corresponding to the identified potential user intent. For example, if the probability identified for the potential user intent is low, user inputs may be required for both a touch pad and a key to initiate the task. If, however, the probability identified for the potential user intent is medium, a user input received via the key may initiate the task. On the other hand, if the probability identified for the potential user intent is high, a user input may be received via the touch pad or the key to initiate the task.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The present invention can be realized in hardware, software, or a combination of hardware and software. The present invention can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The present invention also can be embedded in a computer-usable medium, such as a computer program product or other data programs storage device, readable by a machine, tangibly embodying a program of instructions executable by the machine to perform methods and processes described herein. The present invention also can be embedded in an application product which comprises all the features enabling the implementation of the methods described herein and, which when loaded in a processing system, is able to carry out these methods.

As used herein, the term "real time" means a level of processing responsiveness that a user or system senses as sufficiently immediate for a particular process or determination to be made, or that enables the processor to keep up with some external process.

The terms "computer program," "software," "application," variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, an application can include, but is not limited to, a script, a subroutine, a function, a procedure, an object method, an object implementation, an executable application, an applet, a servlet, a MIDlet, a source code, an object code, a shared library/dynamic load library and/or other sequence of instructions designed for execution on a processing system.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language).

Moreover, as used herein, ordinal terms (e.g. first, second, third, fourth, fifth, sixth, seventh, eighth, ninth, tenth, and so on) distinguish one message, signal, item, object, device, system, apparatus, step, process, or the like from another message, signal, item, object, device, system, apparatus, step, process, or the like. Thus, an ordinal term used herein need not indicate a specific position in an ordinal series. For example, a process identified as a "second process" may occur before a process identified as a "first process." Further, one or more processes may occur between a first process and a second process.

This invention can be embodied in other forms without departing from the spirit or essential attributes thereof. Accordingly, reference should be made to the following claims, rather than to the foregoing specification, as indicating the scope of the invention.

What is claimed is:

1. A method of dynamically adapting a sensitivity of at least one user interface component on an electronic device, comprising:
   identifying a device context corresponding to the electronic device;
   processing the device context in real time to identify a potential user intent and to determine a probability that the potential user intent corresponds to an actual user intent;
   selecting a user input sensitivity parameter based on the potential user intent and the determined probability; and
   adapting the sensitivity of the at least one user interface component to correspond to the user input sensitivity parameter.

2. The method of claim 1, further comprising:
   when the probability that the potential user intent corresponds to the actual user intent is below or above a threshold, soliciting at least one user input prior to adapting the sensitivity of the at least one user interface component.

3. The method of claim 1, further comprising:
responsive to adapting the sensitivity of the at least one user interface component, soliciting at least one user input.

4. The method of claim 1, wherein identifying the device context corresponding to the electronic device comprises:
processing data selected from a group consisting of sensor data received from at least one sensor, data that indicates a state of at least one application instantiated on the electronic device and data corresponding to at least one user preference.

5. The method of claim 1, further comprising:
processing the device context in real time to recognize at least one user gesture;
wherein identifying the potential user intent comprises processing the user gesture.

6. The method of claim 5, wherein processing the device context in real time to recognize the at least one user gesture comprises:
identifying probability data within a map that represents a mapping between the device context and a set of probabilities that the gesture is occurring; and
associating the identified probability data with the recognized gesture.

7. The method of claim 1, wherein processing the device context in real time to identify the potential user intent and determine the probability that the potential user intent corresponds to the actual user intent comprises:
identifying probability data within a map that represents a mapping between the device context and a set of probabilities that reflect a user's near-term intentions for using the electronic device to accomplish a specific task; and
associating the identified probability data with the potential user input.

8. The method of claim 1, wherein adapting the sensitivity of the at least one user interface component to correspond to the user input sensitivity parameter comprises:
applying a weighting factor to a control sensitivity that is determined, at least in part, on the determined probability in order to determine a user input sensitivity parameter that is applied to the user interface component.

9. The method of claim 1, further comprising:
selecting a haptic response parameter based on the potential user intent and the determined probability; and
communicating the haptic response parameter to the user interface to indicate to the user interface to generate a haptic response via the at least one user interface component.

10. An electronic device, comprising:
a controller that:
identifies a device context corresponding to the electronic device;
processes the device context in real time to identify a potential user intent and to determine a probability that the potential user intent corresponds to an actual user intent;
selects a user input sensitivity parameter based on the potential user intent and the determined probability; and
adapts the sensitivity of the at least one user interface component to correspond to the user input sensitivity parameter.

11. The electronic device of claim 10, wherein:
when the probability that the potential user intent corresponds to the actual user intent is below or above a threshold, the controller solicits at least one user input prior to adapting the sensitivity of the at least one user interface component.

12. The electronic device of claim 10, wherein:
responsive to adapting the sensitivity of the at least one user interface component, the controller solicits at least one user input.

13. The electronic device of claim 10, further comprising:
at least one sensor;
wherein:
to identify the device context corresponding to the electronic device, the controller processes data selected from a group consisting of sensor data received from the sensor, data that indicates a state of at least one application instantiated on the electronic device and data corresponding to at least one user preference.

14. The electronic device of claim 10, wherein:
the controller processes the device context in real time to recognize at least one user gesture; and
the controller processes the user gesture to identify the potential user intent.

15. The electronic device of claim 14, wherein:
the controller identifies probability data within a map that represents a mapping between the device context and a set of probabilities that the gesture is occurring; and
the controller associates the identified probability data with the recognized gesture.

16. The electronic device of claim 10, wherein:
the controller identifies probability data within a map that represents a mapping between the device context and a set of probabilities that reflect a user's near-term intentions for using the electronic device to accomplish a specific task; and
the controller associates the identified probability data with the potential user input.

17. The electronic device of claim 10, wherein:
the controller applies a weighting factor to a control sensitivity that is determined, at least in part, on the determined probability in order to determine a user input sensitivity parameter that is applied to the user interface component.

18. The electronic device of claim 10, further comprising:
a haptic response device:
wherein:
the controller selects a haptic response parameter based on the potential user intent and the determined probability; and
the controller communicates the haptic response parameter to the user interface to indicate to the user interface to generate a haptic response via the at least one user interface component.

19. A computer program product comprising:
a computer-usable medium comprising computer-usable program code that dynamically adapts a sensitivity of at least one user interface component on an electronic device, the computer-usable medium comprising:
computer-usable program code that identifies a device context corresponding to the electronic device;
computer-usable program code that processes the device context in real time to identify a potential user intent and to determine a probability that the potential user intent corresponds to an actual user intent;
computer-usable program code that selects a user input sensitivity parameter based on the potential user intent and the determined probability; and
computer-usable program code that adapts the sensitivity of the at least one user interface component to correspond to the user input sensitivity parameter.

20. The computer program product of claim 19, wherein the computer-usable medium further comprises:

computer-usable program code that solicits at least one user input prior to adapting the sensitivity of the at least one user interface component when the probability that the potential user intent corresponds to the actual user intent is below or above a threshold.

* * * * *